United States Patent Office 2,730,495
Patented Jan. 10, 1956

2,730,495

ALKYL AND CYCLOALKYL HYDROPEROXIDES

John Alan Gray, Northwich, England, assignor to Imperial Chemical Industries Limited, a corporation of Great Britain No Drawing. Application April 4, 1952,
Serial No. 280,665

Claims priority, application Great Britain
April 13, 1951

5 Claims. (Cl. 204—162)

This invention relates to a new process for the manufacture of alkyl and cycloalkyl hydroperoxides by which they can readily be obtained in the pure state.

We have found that a new reaction occurs between a paraffin in the vapour phase and oxygen when there is present a means by which the mixture absorbs untraviolet light.

According to the present invention, we manufacture alkyl and cycloalkyl hydroperoxides by a process which comprises exposing to ultraviolet light a gaseous mixture containing oxygen, one or more volatile paraffins or cycloparaffins, and a photosensitizer capable of absorbing ultraviolet light, and then condensing out the hydroperoxide so obtained.

Any paraffin or cycloparaffin which is sufficiently volatile, for example those containing from 1 to 10 carbon atoms, can be used, and the mixture with oxygen can contain inert materials such as nitrogen. Suitable proportions of paraffin to oxygen are from 1 to 100 volumes of paraffin per volume of oxygen, but it is convenient to use from 5 to 20 volumes.

The sensitizer used should be a metallic vapour such as mercury, zinc or cadmium, and it should be the same metal as in the ultraviolet lamp which is used to emit the light. Any high energy emitter will do as source of ultraviolet light and it is convenient to use a mercury vapour lamp in a quartz tube. The amount of sensitizer is not critical, but it is desirable to use as much as can conveniently be kept in the vapor phase in the conditions used.

The temperature should be high enough to volatilise the paraffin should not be above the temperature at which the desired hydroperoxide is stable. Thus, although we may use temperatures below 0° C. we generally use a temperature between 10° and 80° C., preferably about 40° C.

A suitable reaction vessel may be made from quartz, for example in the form of a helix, or the ultraviolet lamp may be immersed if desired in the reaction vessel itself.

The reaction can be carried out batchwise but is preferably performed by passing the gas mixture through the reaction space continuously. The hydroperoxide is separated from the mixture by condensation and is obtained in a substantially pure form because virtually no side reactions occur. With a continuous reaction the conversion per pass is of the order of magnitude of 0.1 volume per cent with a contact time of a few seconds, and it is dependent on the amount of light absorbed. The remainder of the gas mixture can be recycled after resaturating if necessary with sensitizer, so that the yield is well over 50% on the amount of paraffin used.

Hydroperoxides obtained by the process of this invention are virtually pure and are of substantial value as catalysts for vinyl and other polymerisation processes. They can begin to decompose at temperatures from about 20° to 120° C. depending on the number of carbon atoms and the amount of branching, and thus provide a means of carrying out polymerisation processes at these temperatures.

The invention is illustrated but not restricted by the following example. Although it has only been exemplified herein with respect to ethane, the process can be operated with methane, propane, butane and other paraffins, as well as with cyclohexane and other cycloparaffins.

*Example*

A mixture of ethane and oxygen in the volume ratio 9:1 and at atmospheric pressure was saturated with mercury vapour at 40° C. and passed through a quartz reaction vessel which was illuminated by light of wavelength 2537A. The absorbed illumination was $10^5$ microwatts per cc. and the time of residence in the illuminated zone was 10 secs. The exit gas was passed through a vapour trap cooled to −80° C., were ethyl hydroperoxide and mercury collected as the sole non-volatile products. The gases leaving the cooled trap were recycled. The hydroperoxide was then distilled from the residual mercury, and the distillate so obtained contained over 90% ethyl hydroperoxide. The conversion of ethane to hydroperoxide was 0.1% per pass.

What I claim is:

1. A proces for the manufacture of alkyl and cycloalkyl hydroperoxides which comprises providing a gaseous mixture comprising oxygen, at least one volatile paraffin, and a metallic vapor photosensitizer selected from the group consisting of mercury, zinc, and cadmium, exposing said gaseous mixture to ultraviolet light at a temperature not exceeding 80° C. so as to raise the said photosensitizer to a high energy level by absorption of ultraviolet light to thereby produce hydroperoxide, and then condensing out the hydroperoxide so obtained, said metallic vapor photosensitizer and ultraviolet light being the sole catalytic agents employed.

2. A process for the manufacture of ethyl hydroperoxide which comprises providing a gaseous mixture containing one volume of oxygen and from one to 100 volumes of ethane, said mixture being saturated with a metallic vapor photosensitizer selected from the group consisting of mercury, zinc, and cadmium, exposing said gaseous mixture to ultraviolet light at a temperature not exceeding 80° C. so as to raise the said photosensitizer to a high energy level by absorption of ultraviolet light to thereby produce the ethyl hydroperoxide, and then cooling below 0° C. to condense out the ethyl hydroperoxide so obtained, said metallic vapor photosensitizer and ultraviolet light being the sole catalytic agents employed.

3. A process for the manufacture of alkyl and cycloalkyl hydroperoxides which comprises providing a gaseous mixture consisting essentially of oxygen, at least one volatile paraffin, and a metallic vapor photosensitizer selected from the group consisting of mercury, zinc, and cadmium, exposing said gaseous mixture to ultraviolet light at a temperature not exceeding 80° C. so as to raise the said photosensitizer to a high energy level by absorption of ultraviolet light to thereby produce hydroperoxide, and then condensing out the hydroperoxide so obtained, said metallic vapor photosensitizer and ultraviolet light being the sole catalytic agents employed.

4. A process as claimed in claim 1 in which the said volatile paraffin contains from 1 to 10 carbon atoms and the said photosensitizer is raised to a high energy level by exposure to a metallic vapor lamp.

5. A process as claimed in claim 4 in which the metallic vapor lamp is a mercury vapor lamp.

(References on following page)

References Cited in the file of this patent

UNITED STATES PATENTS

| | | |
|---|---|---|
| 2,423,949 | Rust et al. | July 15, 1947 |
| 2,435,763 | Vaughan et al. | Feb. 10, 1948 |
| 2,558,844 | Gray et al. | July 3, 1951 |

FOREIGN PATENTS

| | | |
|---|---|---|
| 307,406 | Great Britain | Mar. 4, 1929 |

OTHER REFERENCES

Schumacher: Chemical Abstracts, vol. 30 (1936), p. 7041.